United States Patent [19]

Morand et al.

[11] Patent Number: 6,063,447
[45] Date of Patent: May 16, 2000

[54] PROCESS FOR TREATING THE SURFACE OF METAL PARTS

[75] Inventors: Claude Morand, Miramas; Ronald Kefferstein, Saint Victoret, both of France

[73] Assignee: Sollac, Puteaux, France

[21] Appl. No.: 09/129,761

[22] Filed: Aug. 5, 1998

[30] Foreign Application Priority Data

Aug. 7, 1997 [FR] France .................................. 97 10153

[51] Int. Cl.$^7$ ...................................................... B05D 7/14
[52] U.S. Cl. ................... 427/388.4; 428/461; 106/14.13; 106/14.18; 106/14.26; 106/14.42; 106/14.43
[58] Field of Search ...................... 427/388.4; 106/14.13, 106/14.14, 14.18, 14.22, 14.23, 14.24, 14.26, 14.41, 14.42, 14.43; 428/461

[56] References Cited

U.S. PATENT DOCUMENTS

| | | |
|---|---|---|
| 3,597,152 | 8/1971 | Shaw . |
| 4,696,763 | 9/1987 | Bentley et al. ....................... 106/14.13 |
| 5,230,730 | 7/1993 | Speckmann et al. ................. 106/14.13 |
| 5,391,396 | 2/1995 | Morrand .................................. 427/156 |

FOREIGN PATENT DOCUMENTS

| | | |
|---|---|---|
| 0 129 506 | 12/1983 | European Pat. Off. . |
| 0 577 486 | 1/1994 | European Pat. Off. . |
| 0 736 592 | 10/1996 | European Pat. Off. . |
| 146136 | 12/1988 | Poland . |
| 157444 | 5/1992 | Poland . |
| 105046 | 4/1995 | Romania . |
| 97 21793 | 6/1997 | WIPO . |

*Primary Examiner*—Erma Cameron
*Attorney, Agent, or Firm*—Oblon, Spivak, McClelland, Maier & Neustadt, P.C.

[57] ABSTRACT

The present invention relates to a process for treating the surface of a metal part to prepare it for drawing and to protect it temporarily against corrosion, comprising applying an aqueous treatment composition to the surface of said part and drying the aqueous composition so applied, characterized in that the aqueous composition is first obtained by mixing:

an aqueous solution comprising at least one alcohol or fatty acid polyethoxylate; and an oil-in-water emulsion comprising at least 3% to 13% by volume of an oil phase comprising at least 75% to 90% by volume of at least one mineral oil and 5% to 10% by volume of at least one surfactant.

The invention also relates to the metal parts so obtained.

20 Claims, No Drawings

PROCESS FOR TREATING THE SURFACE OF METAL PARTS

The present invention relates to a surface treatment for metal parts, intended simultaneously to provide them with temporary protection against corrosion and with sufficient lubrication for drawing.

Protecting metallic surfaces, more particularly sheet metal, against corrosion is a perennial problem for steelmakers. Numerous formulations have already been developed for this purpose. They are intended to protect the sheet metal surface to which they are applied with films of grease, in particular of traditional protective oils or, more recently, a non-greasy coating (FR 92 08 037). One approach to optimising the corrosion resistance of such coatings is to incorporate one or more amine-containing or sulphonate derivative type corrosion inhibitors into the compositions of the coatings.

However, the majority of such formulations have essentially been developed to increase the corrosion resistance without at the same time seeking to improve drawability.

Pickled sheet metal for drawing is a developing product and, to broaden the use of a protective film in this market, it is imperative that the film has tribological properties that reduce the risks of the sheet seizing during drawing.

The aim of the present invention is to provide a treatment process which can provide dry films which satisfy two major criteria for the development of pickled sheet metal, namely protection against corrosion and improved drawability.

The coating obtained using the process of the present invention has the advantage of significantly simplifying drawing without comprising corrosion resistance. It can thus limit or even remove the need for re-oiling in the press when forming parts.

More precisely, the present: invention provides a process for treating the surface of a metal part to prepare it for drawing and to protect it temporarily against corrosion, comprising applying an aqueous treatment composition to the surface of said part and drying the applied aqueous composition, characterised in that said aqueous composition is first obtained by mixing:

an aqueous solution comprising at least one alcohol or fatty acid polyethoxylate; and an oil-in-water emulsion comprising at least 3% to 13% by volume of an oil phase comprising at least 75% to 90% by volume of at least one mineral oil and 5% to 10% by volume of at least one surfactant.

Unexpectedly, the applicant has shown that, using the protocol which is claimed, a combination of a polyethoxylate with an oil-in-water emulsion can endow the coating incorporating them with advantageous behaviour both as regards corrosion resistance and as regards drawing:

Surprisingly, this behaviour is optimum when the two components are mixed in the form of aqueous solution and oil-in-water emulsion, respectively.

Thus it has proved to be advantageous first to dissolve the polyethoxylate in water and then to add the soluble oil emulsified in water. The concentration of each mixture is, of course, adjusted so as to obtain a final composition wherein the concentration of each component is clearly defined.

The process of the present invention probably encourages better fixing of the polyethoxylate on the surface of the treated metal. When the polyethoxylate is added directly to the oil, it is uniformly distributed in the oil droplets. After application, the film formed has the same structure. This means that the dry film is formed from droplets comprising polyethoxylate particles, reducing their mobility. In contrast, if the polyethoxylate is first dissolved in water, when the product is applied to the metal surface its particles are not enclosed in oil droplets. They are considered to have much higher mobility and are preferentially fixed on contact with the surface of the part. The drawing properties would then be produced by the preferential fixing of the compound on contact with the metal surface.

The polyethoxylates used in the present invention are preferably $C_3$ to $C_{22}$ alcohol or fatty acid polyethoxylates containing about 30 to about 250 ethylene oxide moieties.

They preferably have general formula R—O—($CH_2$—$CH_2$—O)$_n$—H where ROH represents a $C_3$ to $C_{22}$ alcohol or fatty acid and n is in the range 30 to 250.

The number of "ethylene oxide", moieties per molecule in the polyethoxylate product is preferably adjusted to obtain a polyethoxylate with an HLB (hydrophilic-lipophilic balance—scale of 0.1 to 20) of at least 14.

The term "HLB" (hydrophilic-lipophilic balance) means the ratio of the hydrophobic nature of the lipophilic portion of the polyethoxylate molecules to the hydrophilic nature of the solubilising "ethoxy" groups of those molecules; the term is routinely used in the surfactant field (see "Techniques de l'Ingénieur" ("Engineering Techniques"), chapter A7610: "Les agents de surface" ("Surfactants").

Preferably, the product is a polyethoxylate of one or more lanoline derivatives, said derivatives being sterols, fatty acids or fatty alcohol esters.

More preferably, the lanoline derivatives are selected from fatty alcohols such as lanosterol, cholesterol, isocholesterol, and fatty acids and esters derived from lanoline.

As an example of the invention, an aqueous solution of lanosterol polyethoxylate is used where n, the number of "ethylene oxide" moieties, is in the range 30 to 150, preferably in the order of 75, or a solution of castor oil polyethoxylate is used, optionally hydrogenated, with the number of ethylene oxide moieties being in the range 30 to 250, preferably in the order of 200.

The concentration of polyethoxylates in the aqueous treatment composition is advantageously 0.25% to 1.5% by weight, preferably in the order of 0.75% by weight, with respect to the total volume.

If necessary, in particular depending on the storage and application constraints imposed on these solutions, an antioxidant, a preservative (or bactericide) and an antifoaming agent can be added to the aqueous solution.

The oil-in-water emulsion can be defined as comprising, dispersed in water, at least 3% to 13% by volume of an oil phase comprising 75% to 90% by volume of at least one mineral oil, 5% to 10% by volume of at least one surfactant and 5% to 15% by volume of a corrosion inhibitor.

The emulsion preferably comprises about 6% by volume of mineral oil dispersed in the aqueous phase.

The oil contained in the oily phase of the emulsion can be a vegetable, mineral or animal oil.

The oil is advantageously a paraffinic or naphthenic mineral oil or a mixture thereof.

The preferred mineral oil is AQUASAFE 21® soluble oil from CASTROL.

The preferred surfactant in the oily phase is a polyoxyethylene type surfactant.

Advantageously, the corrosion inhibitor in the oil phase is a carboxylic acid, a barium or sodium alkylsulphonate or a salt of an amine and a fatty acid.

The aqueous solution based on alcohol or fatty acid polyethoxylates and the aqueous emulsion of oil are preferably mixed in a polyethoxylate/oil base weight ratio in the range from about 5% to about 20%, more preferably in the order of 15%.

In an advantageous implementation of the invention, a heterocyclic carboxylic acid thioether type corrosion inhibitor in its neutralised form is also introduced into the aqueous phase of the aqueous treatment composition. It is incorporated in the form of an aqueous solution, possibly distinct from that containing the alcohol or fatty acid polyethoxylate.

It is preferably a hydrosoluble salt of benzothiazolylthiosuccinic acid. Since this acid is not hydrosoluble, it is present in the aqueous composition in a neutralised form. The acid can be neutralised, for example, by ammonia, morpholine, ethanolamine, ethanol or potassium hydroxide.

The corrosion inhibitor is preferably incorporated in an amount of 1 g/l to 10 g/l of the composition obtained in accordance with the invention, more preferably in an amount of about 2.5 g/l.

Surprisingly, in the presence of this corrosion inhibitor, the tribological properties improve, this improvement being particularly significant when the polyethoxylate used is slightly ethoxylated. This is particularly apparent from the results of Example 2. A small number of ethylene oxide moieties can thus result in better corrosion resistance.

In a preferred implementation of the invention, an aqueous composition of the present invention containing a hydrosoluble benzothiazolylthiosuccinic acid salt comprises an alcohol or fatty acid polyethoxylate with a smaller number of ethylene oxide moieties compared with an aqueous composition which is free of the hydrosoluble benzothiazolylthiosuccinic acid salt.

The composition of the invention can be applied to the metal part to be treated using any appropriate conventional means, such as roll coating or analogous apparatus, or by spraying. The treated part is then dried to obtain a dry lubricant film in accordance with the invention.

Drying, preferably by heating, can for example be carried out by heating the treated part to a temperature in the range 50° C. to 100° C. for a time in the range about 20 seconds to about 10 minutes. It is continued until the water has been completely eliminated to produce a film with better performance.

The surface density of the dry film applied to the surface of the part is preferably in the range 300 mg/m$^2$ to 800 mg/m$^2$, more preferably over 500 mg/m$^2$.

The present invention also encompasses a metal part coated with a dry lubricant film obtained using the process as claimed.

Within the context of the present invention, the term "metal parts" means hot rolled medium thick plates, hot rolled thin sheet, cold rolled steel sheet, and various types of coated steel plate and sheet such as electrogalvanised sheet, galvanised sheet or galvanised alloy sheet.

As described above, the metal parts coated with a dry lubricant film with the composition defined in the invention are corrosion resistant. Further, the coatings derived from the compositions of the invention have satisfactory tribological performance and are thus advantageous as regards drawing. Their frictional characterisation shows that they have a reduced coefficient of friction compared with conventional coatings.

The compositions of the invention can also be effectively applied to metal plates already coated with a dry film and are particularly advantageous for treating turns and external edges of coils already coated with a non-greasy coating or protecting pickled metal parts.

Further advantages of the process of the invention will become clear from the following non-limiting examples illustrating the present invention.

Equipment and Method
1) Oils

A protective oil used on sheet metal to protect against corrosion (QUAKER 80.21).

AQUASAFE 21 from CASTROL, a soluble oil composed of 80% to 95% of a mineral base (naphthenic and paraffinic). Surfactants are incorporated into this product so it can be emulsified in water. The corrosion resistance properties are obtained using fatty acids and their amide type derivatives.

2) Polyethoxylates

A lanosterol ethoxylate (lanoline ethoxylated containing 75 ethylene oxide radical).

A hydrogenated ethoxylate of castor oil containing 200 ethylene oxide radicals (hydrogenated or non-hydrogenated ethoxylate).

3) CIBA IRGACOR 252 Benzothiazolylthiosuccinic Acid

The BTSA was taken up into aqueous solution after neutralising with ammonia or ethanolamine.

Methods

1) Frictional Characterisation of Test Compositions

Single pass friction tests were carried out at a pressure from 200 daN to 2000 daN using high-speed steel tools with a surface area of 1 cm$^2$. The rate of displacement was 2 mm/s.

The specimens were taken from 2 mm thick hot pickled grade BS2 sheet.

2) Corrosion Characterisation

The different test compositions were applied to pickled E24 steel specimens in proportions such that the final surface density deposited on the specimens was in the order of 500 mg/m$^2$ (0.5 $\mu$m) A laboratory oiler was used for spray application.

The following tests were carried out in climatic chambers:

compact pack—transport cycles humidotherm (FKW-DIN 50017 cycle)

EXAMPLE 1

Influence of the mode of preparing the treatment composition on the tribological properties of the corresponding coating A hydrogenated castor oil polyethoxylate containing 200 ethylene oxide radicals was mixed with an Aquasafe 21 oil in a polyethoxylate/oil base weight ratio of 15% using the following four protocols:

the polyethoxylate was introduced directly into the Aquasafe 21 oil and then the mixture was introduced into water (protocol a);

the Aquasafe 21 oil was added to water and then the polyethoxylate was added (protocol b);

the polyethoxylate was introduced into the water and then the Aquasafe 21 oil was added, also in aqueous solution (protocol c);

the polyethoxylate was added to a defined volume of water, the oil-in-water Aquasafe 21 based emulsion was prepared in the same volume of water and then the two preparations were mixed (protocol d).

The impact of each of these four methods was measured by determining the difference in the coefficient of friction between a pressure of 200 daN and a pressure of 2000 daN for each of the test compositions.

The frictional characterisation was carried out using the protocol described above (Equipment and Method).

TABLE I

| Protocol | (a) | (b) | (c) | (d) |
|---|---|---|---|---|
| Reduction in coefficient of friction on increase in frictional pressure from 200 daN to 2000 daN | 0.09 | 0.075 | 0.085 | 0.150 |

The results clearly show that the protocol has a significant impact on the performance of the coating. The performance is optimum in terms of friction when the two compounds are mixed in the form of their respective aqueous solutions (protocol (d)). Clearly, with this protocol fixing of the polyethoxylate to the metal surface is optimal. The additive is not fixed by the oil particles. It preferentially affixes to the metal surface (mobility of the additive).

Using this protocol, Aquasafe 21 oil micelles and hydrogenated castor oil polyethoxylate micelles probably have time to form in their respective solutions. Thus in the final treatment composition a large proportion of the polyethoxylate is in the form of autonomous micelles which have an optimum capacity for adsorption onto the metal. Thus a state is encouraged with the polyethoxylate closer to the surface of the treated metal, which leads to an optimum coefficient of friction.

In the case of formulations b and c, the number of polyethoxylate micelles is smaller because some of the polyethoxylate molecules are fixed via Aquasafe 21 oil micelles, which has the effect of dispersing the polyethoxylate throughout the film. It is not solely present in contact with the surface of the treated metal, and this results in reduced frictional properties.

EXAMPLE 2

Influence of the number of ethylene oxide radicals present in the polyethoxylate This test was carried out using two polyethoxylates, a castor oil polyethoxylate and a lanosterol polyethoxylate, with 0, 30, 75 and 200 ethylene oxide radicals.

Each polyethoxylate tested in aqueous solution was added in an amount of 0.75% by weight to an oil-in-water emulsion of composition B or D as defined in Table II below.

TABLE II

| Product B | Oil-in-water emulsion based on 6% Aquasafe 21 soluble oil |
|---|---|
| Product D | Product B + 2.5 g/l of BTSA with the pH stabilised in the range 8.5 to 9 by adding ethanolamine |

The frictional properties of the corresponding coatings were determined using the protocol described above (Equipment and Method).

Table III below shows the coefficient of friction observed for an applied force of 2000 daN.

TABLE III

| Number of ethoxy radicals | Polyethoxylate derivative LANOSTEROL | | Polyethoxylate derivative CASTOR OIL | | CONTROL (with no polyethoxylates) |
|---|---|---|---|---|---|
| | 30 | 75 | 30 | 200 | |
| Mixed with product B (no BTSA), coefficient of friction measured at 2000 daN | 0.125 | 0.080 | 0.125 | 0.070 | Product B 0.13 |
| Mixed with product D (BTSA, 2.5 g/l), coefficient of friction measured at 2000 daN | 0.075 | 0.060 | 0.075 | 0.040 | Product D 0.1 |
| Reduction in coefficient of friction | 0.05 | 0.02 | 0.05 | 0.03 | 0.03 |

For the lanosterol ethoxylate, the best performance was obtained with product D containing 75 radicals. For the castor oil ethoxylate, the greatest reduction in the coefficient of friction was observed with 200 radicals.

These results show that the more water soluble the additive, because of the large number of ethoxylate moieties, the better the frictional performance. Further, a favourable synergistic effect can be seen between the polyethoxylates and the BTSA, which is particularly significant when the polyethoxylate has a lower number of ethylene oxide moieties, namely 75 for the castor oil derivative and 30 for the lanosterol derivative.

EXAMPLE 3

Influence of the Polyethoxylate Concentration With Respect to the Aqueous Emulsion Aquasafe 21 oil was incorporated into water in a concentration of 5% by volume of oily phase. An aqueous solution of a lanosterol polyethoxylate containing 75 EO moieties was then added to this emulsion in concentrations of 5% to 20% (weight/weight) of the quantity of Aquasafe 21 oil, i.e. 0.25% to 1% of the volume of the final composition.

Table IV below summarises the results regarding reduction in the coefficient of friction.

The best results were obtained for a concentration of close to 15%, i.e. a concentration of 0.75% with respect to the total volume of the treatment composition.

TABLE IV

| Polyethoxylate derivative in aqueous emulsion | Lanosterol ethoxylate (75 EO) | | | | | Castor oil ethoxylate (200 EO) | | | | |
|---|---|---|---|---|---|---|---|---|---|---|
| Concentration | 0% | 5% | 10% | 15% | 20% | 0% | 5% | 10% | 15% | 20% |
| Reduction in coefficient of friction on increasing frictional pressure from 200 daN to 2000 daN | 0.075 | — | 0.075 | 0.125 | 0.135 | 0.075 | 0.075 | 0.087 | 0.15 | 0.13 |

EXAMPLE 4

Comparison of a Composition Obtained in Accordance With the Invention With Conventional Drawing Oils The composition of the invention was a product E consisting of product D described in Example 2 with an added hydrogenated castor oil polyethoxylate containing 200 ethylene oxide EO moieties in an amount of 0.75% by weight of the final composition.

The aim of this example was to observe the compatibility of conventional oils used for conventional oiling treatments (for protection and/or drawing) with the treatment of the invention.

whole oil MN 181 from CRODA;

whole oil V 14 from FUCHS;

Soluble oil 450 from CALOTTE;

Soluble oil 72CC from QUAKER.

The tribological performances obtained after a single lubrication treatment, either in accordance with the invention or using conventional oiling, were compared.

For these tests, with the whole oils the rate of application was about 2 g/m$^2$ while with the soluble oils or the treatment of the invention the rate of application was about 500 mg/m$^2$.

The test results are shown in Table V.

The tribological performance obtained was then evaluated firstly after lubrication treatment in accordance with the invention and then after conventional oiling; by comparison with the results of the first series, whether or not the two treatments were compatible could be deduced.

The test results are shown in Table V.

TABLE V

|  | Product E | Mn181 | V14 | 450 | 72CC |
|---|---|---|---|---|---|
| Single treatment Coefficient of friction measured at 2000 daN | 0.035 | 0.130 | 0.075 | 0.130 | 0.130 |
| Two treatments, one in accordance with invention Coefficient of friction measured at 2000 daN | — | 0.045 | 0.045 | 0.110 | 0.125 |

When a single treatment was carried out, the treatment of the invention produced better tribological properties compared with conventional oiling treatments; in the majority of cases, drawing could be carried out directly without re-oiling sheets treated in accordance with the invention.

When sheet re-oiling proved necessary (two treatments), good tribological properties were only retained with the whole oils and the tribological performances obtained depended principally on the treatment of the invention and not on the quality of the whole oil used.

EXAMPLE 5

Corrosion Characterisation of a Composition Obtained in Accordance With the Invention Different compositions obtained using the process of the invention were tested using the protocol described above (Equipment and Method) using the following test carried out in climatic chambers:

compact pack—transport cycles

The compositions of the different formulations tested for corrosion are shown in Table VI below:

TABLE VI

| Mode | Description of applied solution |
|---|---|
| Oil emulsion | 5% Castrol Aquasafe 21 soluble oil in demineralised water pH = 9 |
| Oil emulsion + castor oil containing 200 EO moieties | 5% Castrol Aquasafe 21 soluble oil + 0.75% ethoxylated castor oil (7.5 g/l) in demineralised water pH = 8.5 |
| Oil emulsion + lanosterol containing 75 EO moieties | 5% Castrol Aquasafe 21 soluble oil + 0.75% ethoxylated lanosterol (7.5 g/l) in demineralised water pH = 8.5 |
| Oil emulsion + BTSA + castor oil containing 200 EO moieties | 5% Castrol Aquasafe 21 soluble oil + 0.75% ethoxylated castor oil + 0.25% BTSA + ethanolamine in demineralised water pH = 9 |
| Oil emulsion + BTSA + lanosterol with 75 EO moieties | 5% Castrol Aquasafe 21 soluble oil + 0.75% ethoxylated lanosterol + 0.25% BTSA + ethanolamine in demineralised water pH = 9 |

Detail of transport cycle (1 cycle = 32 hours):
10 h at 40° C. with 95% humidity rate (HR);
4 h at 20° C. with 80% humidity rate (HR);
10 h at −5° C. with 0% humidity rate (HR);
8 h at 30° C. with 85% humidity rate (HR).

In the "transport cycle" configuration, the tests were carried out on compact packs under the following conditions:

each case was represented by 4 specimens;

the observations were made every three cycles.

The packs were opened up and the state of the interfaces was observed.

The following results were observed:

TABLE VII

| Mode (applied at 500 mg/m$^2$) | Number of "transport" cycles before corrosion appeared |
|---|---|
| Oil emulsion | 3–5 cycles |
| Oil emulsion + castor oil | 4 cycles |
| Oil emulsion + lanosterol | 4 cycles |
| Oil emulsion + BTSA + castor oil | 8 cycles |
| Oil emulsion + BTSA + lanosterol | 7 cycles |

These results show, in particular, that the compositions of the invention obtained by adding BTSA and a polyethoxylate in the form of an aqueous solution to an oil emulsion yields coatings with advantageous corrosion resistance properties.

We claim:

1. A process for treating the surface of a metal part to prepare it for drawing and to protect it against corrosion, comprising:

applying an aqueous treatment composition to the surface of said part and drying the applied aqueous composition, wherein said aqueous composition is first obtained by mixing:

an aqueous solution comprising at least one alcohol or fatty acid polyethoxylate; and an oil-in-water emulsion comprising at least 3% to 13% by volume of an oil phase comprising (a) at least 75% to 90% by volume of at least one mineral oil and (b) 5% to 10% by volume of at least one surfactant.

2. A process according to claim 1, wherein the alcohol or fatty acid polyethoxylate is a $C_3$ to $C_{22}$ alcohol or fatty acid polyethoxylate containing about 30 to about 250 ethylene oxide moieties.

3. A process according to claim 1 or claim 2, wherein the polyethoxylate has general formula R—O—(CH$_2$—CH$_2$—O)$_n$—H where n is in the range 30 to 250 and R represents the residue of a $C_3$ to $C_{22}$ alcohol or fatty acid.

4. A process according to claim 1, wherein the polyethoxylate is a polyethoxylate of one or more lanolin derivatives, wherein said derivatives are selected from the group consisting of sterols, fatty acids and fatty alcohol esters.

5. A process according to claim 1, wherein the polyethoxylate is selected from a lanosterol polyethoxylate containing about 75 ethylene oxide moieties or a castor oil polyethoxylate, which may or may not be hydrogenated containing about 200 ethylene oxide moieties.

6. A process according to claim 1, wherein the oil-in-water emulsion comprises, dispersed in water, at least 3% to 13% by volume of an oil phase comprising 75% to 90% by volume of at least one mineral oil, 5% to 10% by volume of at least one surfactant and, optionally, 5% to 15% by volume of a corrosion inhibitor.

7. A process according to claim 1, wherein the emulsion comprises about 6% by volume of mineral oil dispersed in the aqueous phase of the emulsion.

8. A process according to claim 1, wherein the oil-in-water emulsion comprises, dispersed in water, at least 3% to 13% by volume of an oil phase comprising 75% to 90% by volume of at least one mineral oil, 5% to 10% by volume of at least one surfactant and, optionally, 5% to 15% by volume of a corrosion inhibitor; and the mineral oil of the oil phase is a paraffinic or naphthenic mineral oil or a mixture thereof.

9. A process according to claim 1, wherein the oil-in-water emulsion comprises, dispersed in water, at least 3% to 13% by volume of an oil phase comprising 75% to 90% by volume of at least one mineral oil, 5% to 10% by volume of at least one surfactant and, optionally, 5% to 15% by volume of a corrosion inhibitor; and the corrosion inhibitor in the oil phase is a carboxylic acid, a barium or sodium alkylsulphonate or a salt of an amine and a fatty acid.

10. A process according to claim 1, wherein the aqueous solution of alcohol or fatty acid polyethoxylates and the oil-in-water emulsion are mixed in a polyethoxylate/oily base weight ratio in the range about 5% to about 20%.

11. A process according to claim 1, wherein the aqueous solution of alcohol or fatty acid polyethoxylates and the oil-in-water emulsion are mixed in a polyethoxylate/oily phase weight ratio of about 15%.

12. A process according to claim 1, wherein the aqueous treatment composition further comprises, in its aqueous phase, a heterocyclic carboxylic acid thioether corrosion inhibitor in its neutralized form.

13. A process according to claim 1, wherein the aqueous treatment composition further comprises, in its aqueous phase, a heterocyclic carboxylic acid thioether corrosion inhibitor in its neutralized form and said thioether is mixed with the oil-in-water emulsion in the form of an aqueous solution, optionally distinct from that containing the alcohol or fatty acid polyethoxylate.

14. A process according to claim 1, wherein the aqueous treatment composition further comprises, in its aqueous phase, a heterocyclic carboxylic acid thioether corrosion inhibitor in its neutralized form; and the thioether is a hydrosoluble salt of benzothiazolylthiosuccinic acid.

15. A process according to claim 1, wherein the aqueous treatment composition further comprises, in its aqueous phase, a heterocyclic carboxylic acid thioether corrosion inhibitor in its neutralized form; and the heterocyclic carboxylic acid thioether is present in an amount of 1 g/l to 10 g/l, preferably in an amount of about 2.5 g/l, of said aqueous composition.

16. A process according to claim 1, wherein the aqueous treatment composition further contains a hydrosoluble benzothiazolylthiosuccinic acid salt and an alcohol or fatty acid polyethoxylate with a smaller number of ethylene oxide moieties compared with an aqueous treatment composition which is free of the hydrosoluble benzothiazolylthiosuccinic acid salt.

17. A process according to claim 1, wherein the surface density of the coating obtained on the treated surface after said drying is in the range 300 mg/m$^2$ to 800 mg/m$^2$.

18. A metal part coated with a film obtained using the process defined in claim 1.

19. A process according to claim 1, wherein said aqueous solution comprises at least one alcohol polyethoxylate.

20. A process according to claim 1, wherein said aqueous solution comprises at least one alcohol fatty acid polyethoxylate.

* * * * *